United States Patent
Celik et al.

(10) Patent No.: US 10,603,956 B2
(45) Date of Patent: Mar. 31, 2020

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US); George Michael Stoila, Tallmadge, OH (US); Michael James Hogan, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 252 days.

(21) Appl. No.: 15/938,486

(22) Filed: Mar. 28, 2018

(65) Prior Publication Data

US 2019/0299709 A1  Oct. 3, 2019

(51) Int. Cl.
*B60C 7/26* (2006.01)
*B60B 3/10* (2006.01)
*B60B 25/00* (2006.01)
*B60C 7/14* (2006.01)

(52) U.S. Cl.
CPC .................. *B60C 7/26* (2013.01); *B60B 3/10* (2013.01); *B60B 25/002* (2013.01); *B60B 2320/10* (2013.01); *B60B 2360/10* (2013.01); *B60B 2900/311* (2013.01); *B60C 7/14* (2013.01)

(58) Field of Classification Search
CPC ......... B60B 25/04; B60B 25/002; B60B 3/10; B60B 9/00; B60B 9/02; B60B 9/04; B60B 9/26; B60C 7/14; B60C 7/24; B60C 7/26; B60C 2007/146
See application file for complete search history.

(56) References Cited

U.S. PATENT DOCUMENTS

| | | | |
|---|---|---|---|
| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |
| 4,602,823 A | 7/1986 | Berg |
| 5,343,916 A | 9/1994 | Duddey |
| 5,800,643 A | 9/1998 | Frankowski |
| 6,068,721 A | 5/2000 | Dyer |
| 6,260,598 B1 | 7/2001 | Tanaka |
| 8,962,120 B2 | 2/2015 | Delfino |
| 2004/0069385 A1 | 4/2004 | Timoney |
| 2010/0193097 A1 | 8/2010 | McNier |

(Continued)

OTHER PUBLICATIONS

Non-Provisional U.S. Appl. No. 15/351,706, filed on Nov. 15, 2016.

*Primary Examiner* — Kip T Kotter (74) *Attorney, Agent, or Firm* — Robert N. Lipcsik (57) ABSTRACT

A wheel assembly includes a first rim piece for engaging a rotatable axle; and a second rim piece for engaging the rotatable axle. The first rim piece has axially extending curved friction plates for engaging a first side of a spoke structure of a tire. Axially outer ends of the friction plates engage axially extending lugs of the second rim piece to form a single split wheel assembly.

19 Claims, 10 Drawing Sheets

(56) References Cited

U.S. PATENT DOCUMENTS

2012/0205017 A1* 8/2012 Endicott ............... B60B 1/0223
  152/1
2019/0152256 A1* 5/2019 Hwang ................... B60B 23/10

* cited by examiner

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a first rim piece for engaging a rotatable axle; and a second rim piece for engaging the rotatable axle. The first rim piece has axially extending curved friction plates for engaging a first side of a spoke structure of a tire. Axially outer ends of the friction plates engage axially extending lugs of the second rim piece to form a single split wheel assembly.

According to another aspect of the wheel assembly, each lug of the second rim piece has an axial blind threaded bore for receiving a threaded bolt to secure the tire, the first rim piece, and the second rim piece together.

According to still another aspect of the wheel assembly, the friction plates of the first rim piece have cylindrical convex surfaces corresponding to a shape of the spoke structure of the tire to be engaged by the friction plates.

According to yet another aspect of the wheel assembly, the friction plates of the first rim piece define a semi-cylindrical hollow cavity for receiving the lugs of the second rim piece and bolts.

According to still another aspect of the wheel assembly, the first rim piece includes axially extending curved saddle plates for engaging a second side of the spoke structure of the tire assembly, the second side of the spoke structure being axially opposite the first side of the spoke structure of the tire.

According to yet another aspect of the wheel assembly, the second rim piece includes axially extending curved saddle plates for engaging a second side of the spoke structure of the tire.

According to still another aspect of the wheel assembly, parts of the spoke structure are secured in a sandwich configuration with parts of the spoke structure being disposed between the friction plates and parts of the second rim piece.

According to yet another aspect of the wheel assembly, axially outer ends of saddle plates of both the first rim piece and the second rim piece axially abut each other when the wheel assembly and tire are secured by bolts.

According to still another aspect of the wheel assembly, the first rim piece is constructed as a single integral component.

According to yet another aspect of the wheel assembly, the second rim piece is constructed as a single integral component.

A method in accordance with the present invention secures a wheel assembly and a tire together. The method includes the steps of: laying a first rim piece on a horizontal surface; lowering the tire on to the first rim piece with friction plates corresponding to openings in a spoke structure of the tire; lowering a second rim piece on to the combined first rim piece and tire; inserting radially extending lugs of the second rim piece into corresponding semi-cylindrical cavities of the first rim piece; and securing the first and second rim pieces both circumferentially and radially to each other while simultaneously securing the tire to the first and second rim pieces.

According to another aspect of the method, a further step includes sandwiching parts of the tire between friction plates of the first rim piece and saddle plates of the second rim piece.

According to still another aspect of the method, a further step includes approximating curvatures of surfaces of the friction plates of the first rim piece with curvatures of parts of the tire.

According to yet another aspect of the method, a further step includes interlocking the tire with the first rim piece and the second rim piece.

According to still another aspect of the method, a further step includes securing the first rim piece, the second rim piece, and the tire together for installation on an axle of a vehicle.

According to yet another aspect of the method, a further step includes constructing the first rim piece and the second rim piece of metal.

According to still another aspect of the method, a further step includes sandwiching curved parts of the tire between convex friction plates of the first rim piece and concave saddle plates of the second rim piece.

According to yet another aspect of the method, a further step includes sandwiching curved parts of the tire between convex friction plates of the first rim piece and concave saddle plates of the first rim piece.

According to still another aspect of the method, a further step includes sandwiching curved parts of the tire between convex friction plates of the first rim piece and concave saddle plates of both the first rim piece and the second rim piece.

According to yet another aspect of the method, a further step includes inserting threaded bolts within semi-cylindrical cavities of the first rim piece.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

As shown in FIGS. 5-10, an example tire assembly 140, such as that described in Applicant's U.S. patent application Ser. No. 15/351,706, filed Nov. 15, 2016, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may have an inner central rim, such as an automobile wheel (not shown), and a circular outer flexible ring, which may include a shear band and tread structure, mounted on the inner central rim by a continuous cord/fabric reinforced spoke structure 110 extending between the inner central rim and the outer ring.

The spoke structure 110 may define a plurality of cavities disposed concentrically about the inner central rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure. The cavities of the spoke structure 110 may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure 110 and create a further frictional and/or adhesive securement between the inner central rim and the spoke structure. The spoke structure 110 may comprise a homogenous or heterogeneous polymer and/or a filled polymer.

Spokes of the spoke structure 110 may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure 110. Each cavity may be curvedly shaped to prevent "pinch" points on the reinforcement layer(s) and mitigate compressive stress concentrations on the reinforcement layer(s). The number of cavities may be between 2 and 60 for large scale tire assemblies 140. The inner central rim may include steel, cast iron, aluminum, aluminum alloys, magnesium allows, and/or iron alloys.

Figure 2:
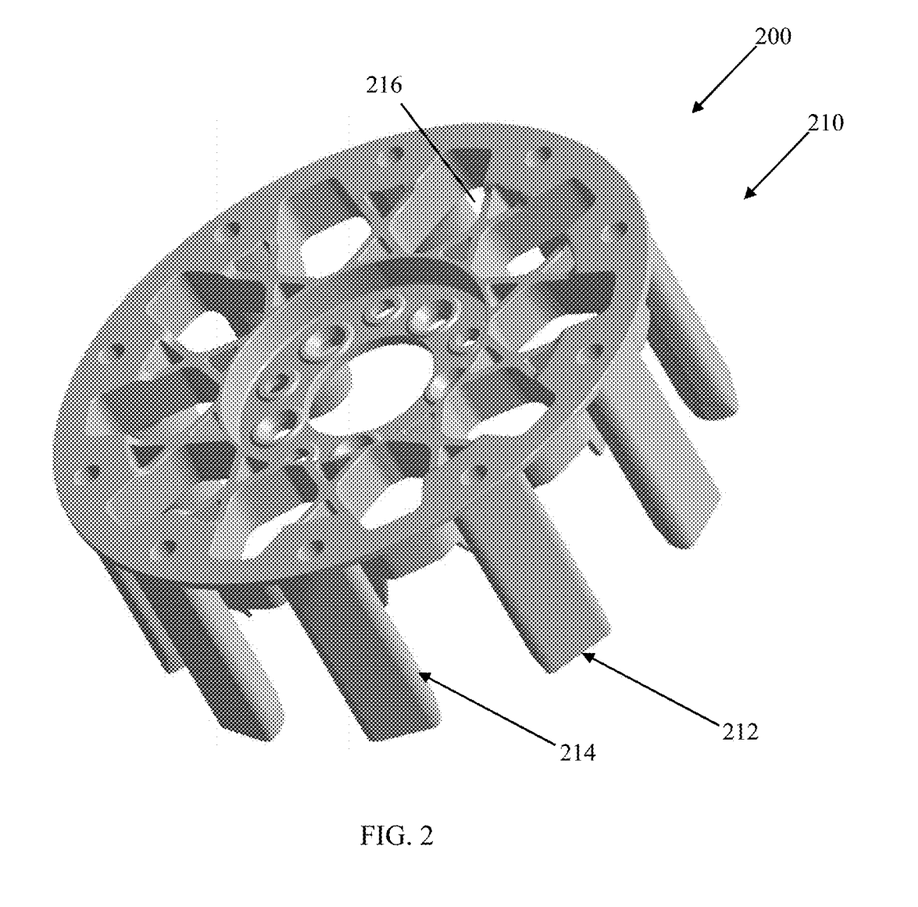
FIG. 2 is another schematic perspective view of the first part of the wheel assembly of FIG. 1.
Figure 3:
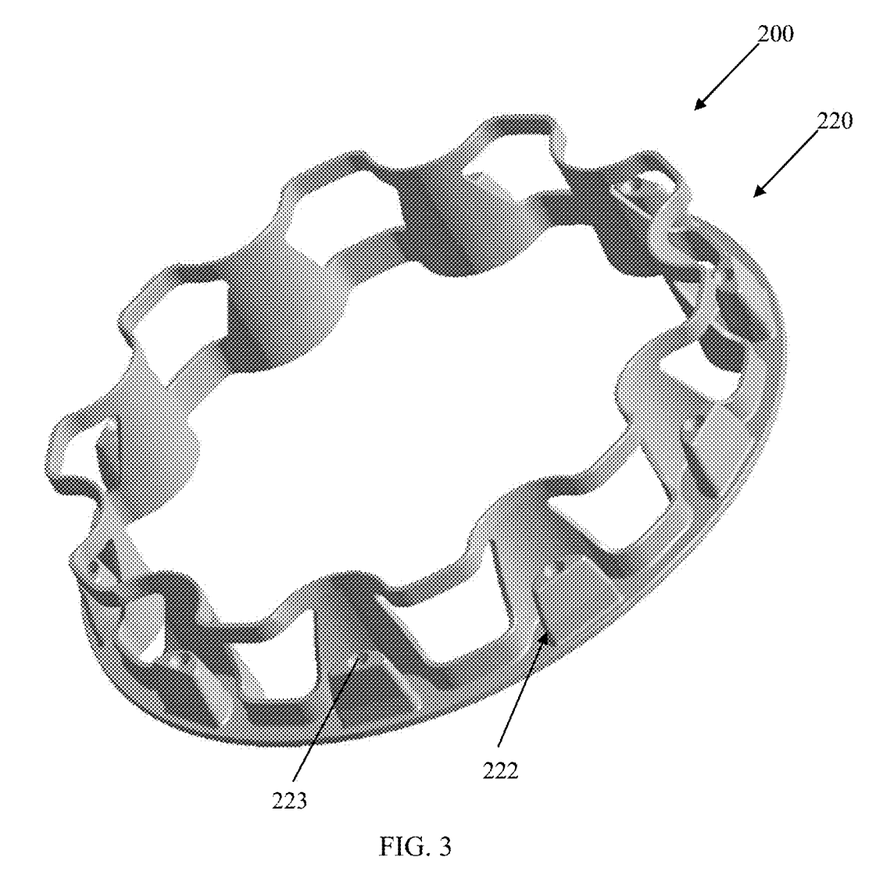
FIG. 3 is a schematic perspective view of a second part of the wheel assembly in accordance with the present invention.
Figure 4:
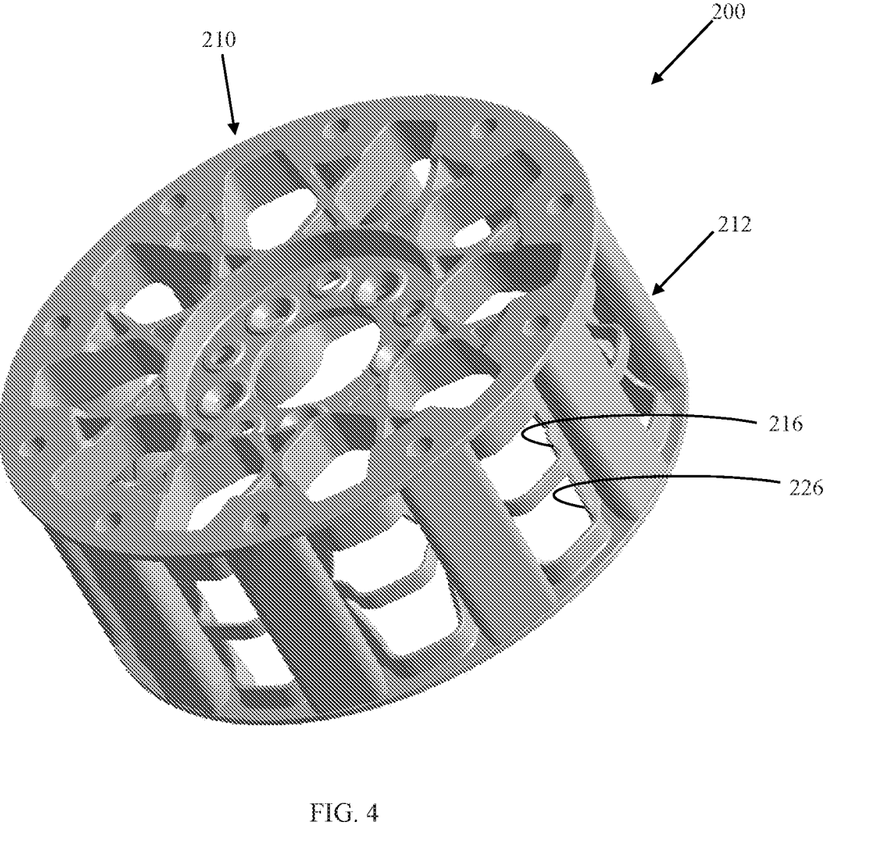
FIG. 4 is a schematic perspective view of both the first and second parts of the wheel assembly in accordance with the present in invention.
Figure 8:
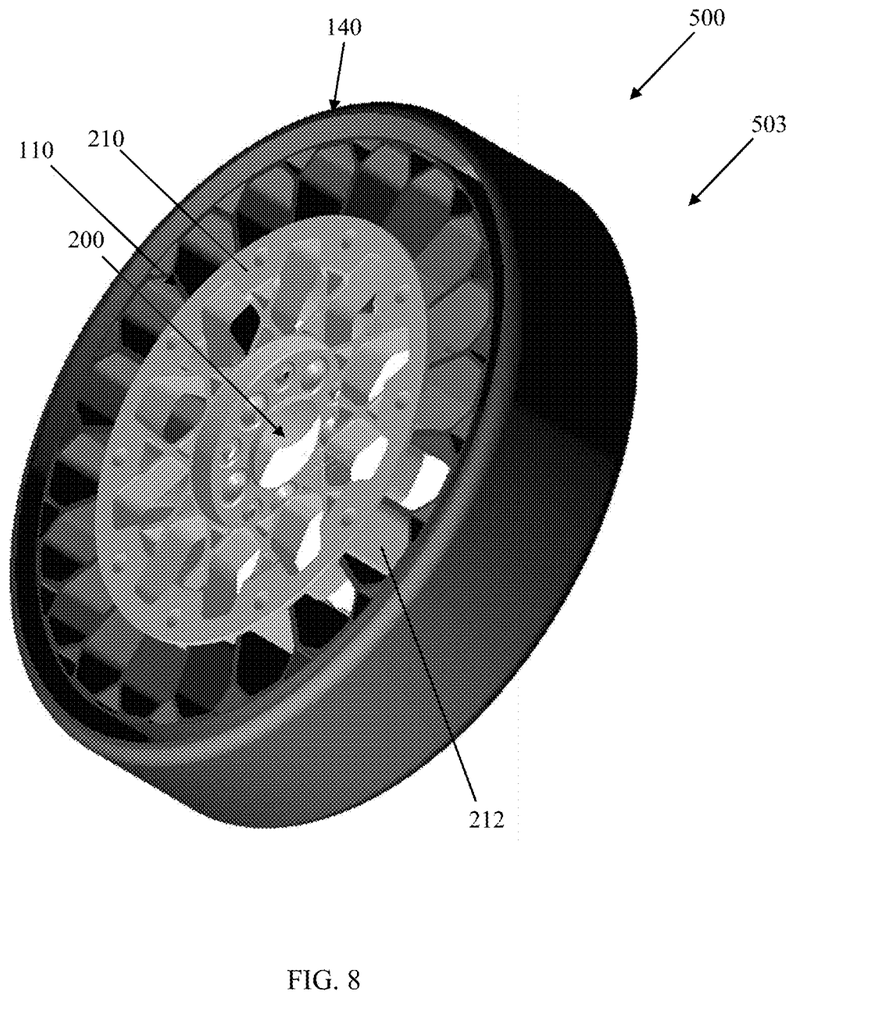
FIG. 8 is still another schematic perspective view of the first and second parts of the wheel assembly in accordance with the present in invention and the example tire.
Figure 9:
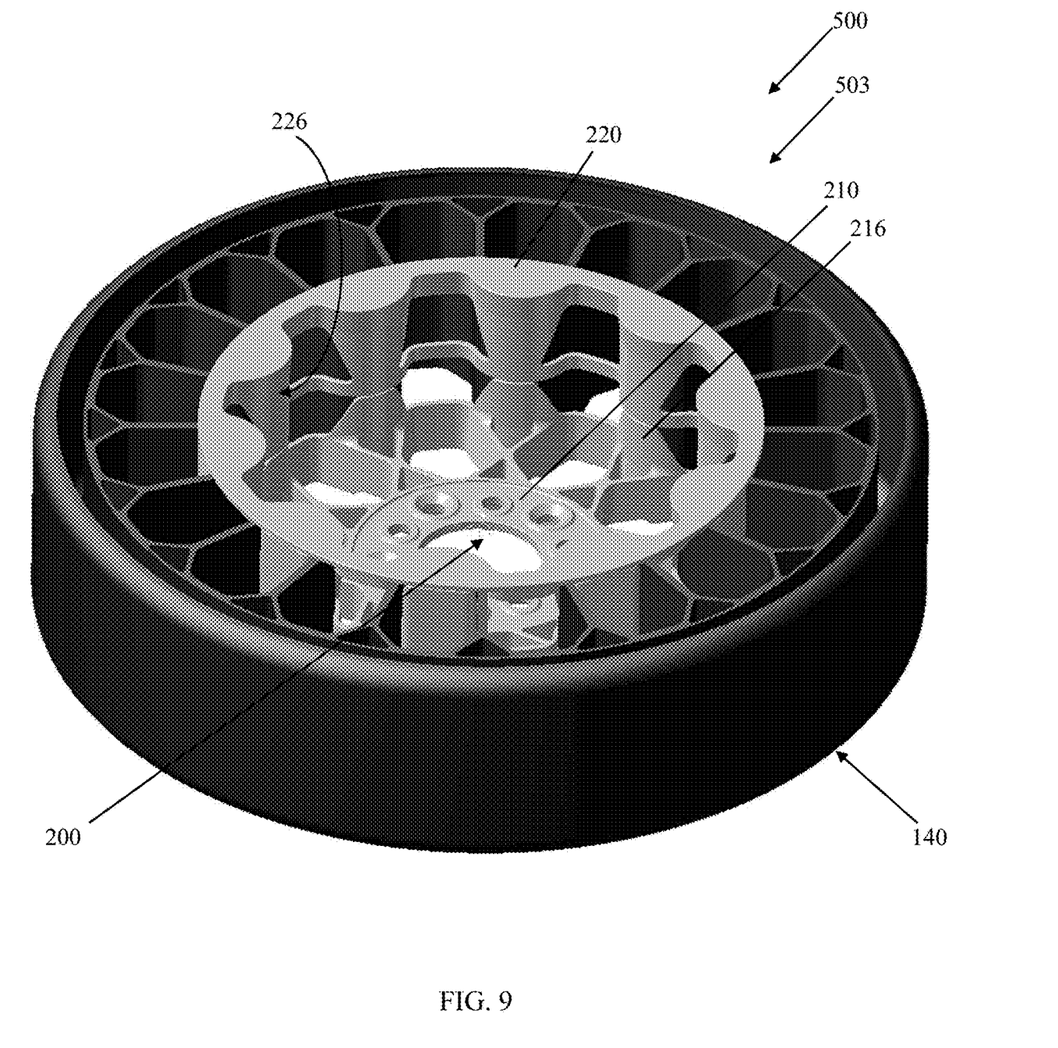
FIG. 9 is yet another schematic perspective view of the first and second parts of the wheel assembly in accordance with the present in invention and the example tire.
Figure 10:
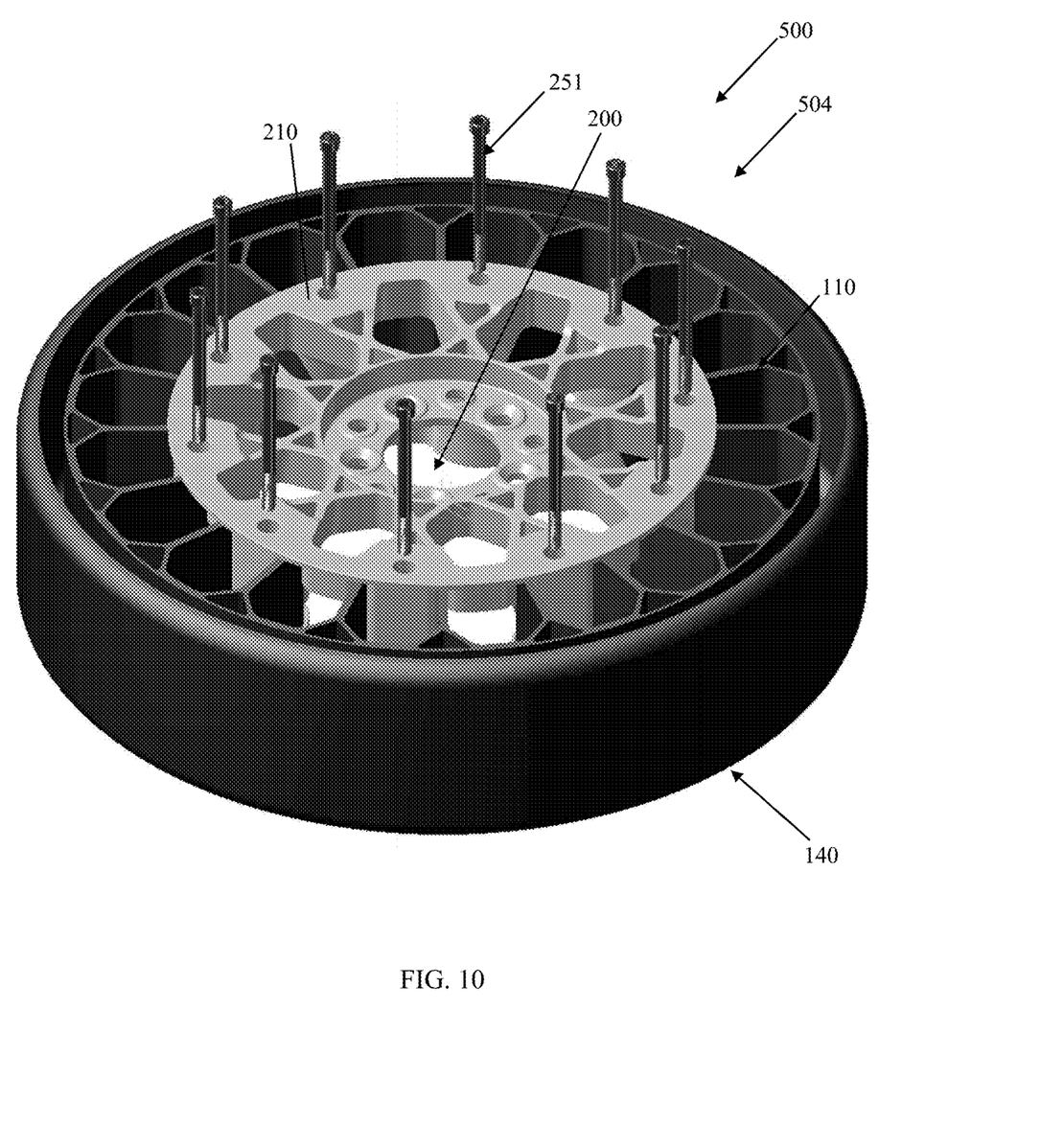
FIG. 10 is a schematic perspective view of the first and second parts of the wheel assembly in accordance with the present in invention, fasteners of the wheel assembly, and the example tire.

FIGS. 1-10 show a wheel assembly 200 in accordance with the present invention for use with pneumatic and/or non-pneumatic tire assemblies, such as the tire assembly 140. The wheel assembly 200 may include a first rim piece 210 and a second rim piece 220 both for engaging a rotatable axle or similar structure (not shown). The first rim piece 210 has axially extending curved friction plates or friction tubes 212 (10 shown) for engaging a first side of the spoke structure 110 of the example tire assembly 140. The axially outer ends of the friction plates 212 may engage axially extending lugs 222 (10 shown) of the second rim piece 220 to form a single split wheel assembly 200 (FIG. 4). Each lug 222 may have an axial blind threaded bore 223 for receiving a threaded bolt 251 to secure the tire assembly 140, the first rim piece 210, and the second rim piece 220 together (FIG. 10). The friction plates 212 may have cylindrical convex surfaces 214 corresponding to the shape of the spoke structure 110 of the tire assembly 140 to be engaged by the friction plates. The friction plates 212 may further define a semi-cylindrical hollow cavity for receiving part of the second rim piece 220 and the bolts 251.

The first rim piece 210 may include axially extending curved saddle plates 216 for engaging a second side of the spoke structure 110 of the example tire assembly 140. The second side is opposite the first side of the spoke structure 110 of the example tire assembly 140. The second rim piece 220 may also include axially extending curved saddle plates 226 for engaging the second side of the spoke structure 110 of the example tire assembly 140. Parts of the first spoke structure 110 may thus be secured in a sandwich configuration with parts of the spoke structure 110 being disposed between the friction plates 212 on the first side and saddle plates 216, 226 on the opposite second side. The outer ends of the saddle plates 216, 226 may axially abut each other (FIG. 6) once the entire wheel assembly 200 and tire assembly 140 are secured by the bolts 251.

Figure 1:
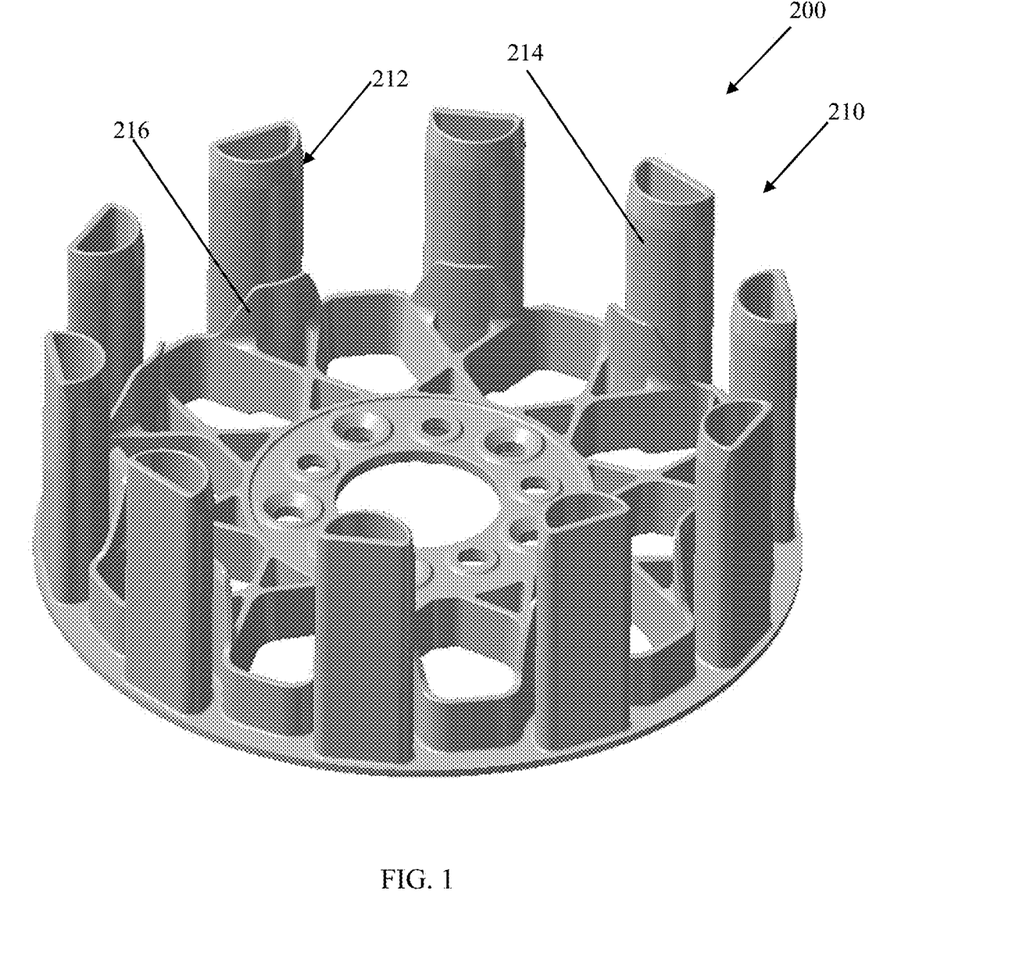
FIG. 1 is a schematic perspective view of a first part of an example wheel assembly in accordance with the present invention.

FIGS. 1-10 represent an example method for securing the wheel assembly 200 and the tire assembly 140 together for installation on a vehicle. FIGS. 1-2 show the first rim piece 210 by itself. FIG. 3 shows the second rim piece 220 by itself. FIG. 4 shows the first rim piece 210 and the second rim piece 220 assembled without the tire assembly 140. In this configuration, the hollow outer ends of the friction plates 212 of the first rim piece 216 may axially engage the solid lugs 222 of the second rim piece 220 such that both rim pieces are aligned radially for rotation upon installation on a vehicle.

Figure 5:
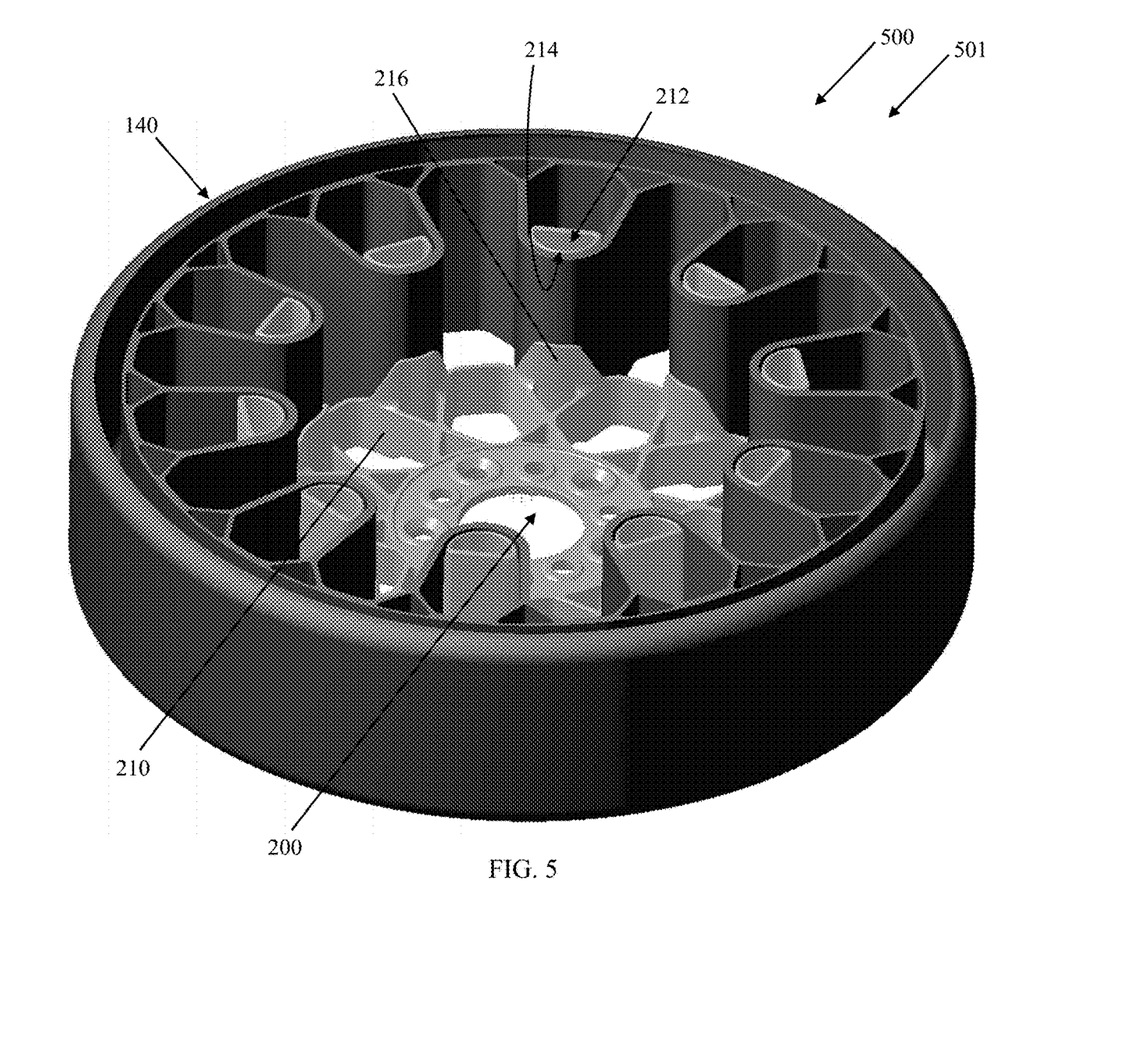
FIG. 5 is a schematic perspective view of the first part of the wheel assembly in accordance with the present in invention and an example tire.

FIG. 5 shows a first step 501 of an example assembly method 500 in accordance with the present invention. The first rim piece 210 may be laid on a horizontal surface and the tire assembly 140 may be lowered on to the first rim piece with the friction plates 212 corresponding to openings in the spoke structure 110. The curvature of the openings may closely approximate the curvature of the cylindrical surfaces 214 of the friction plates 212 (FIG. 5).

Figure 6:
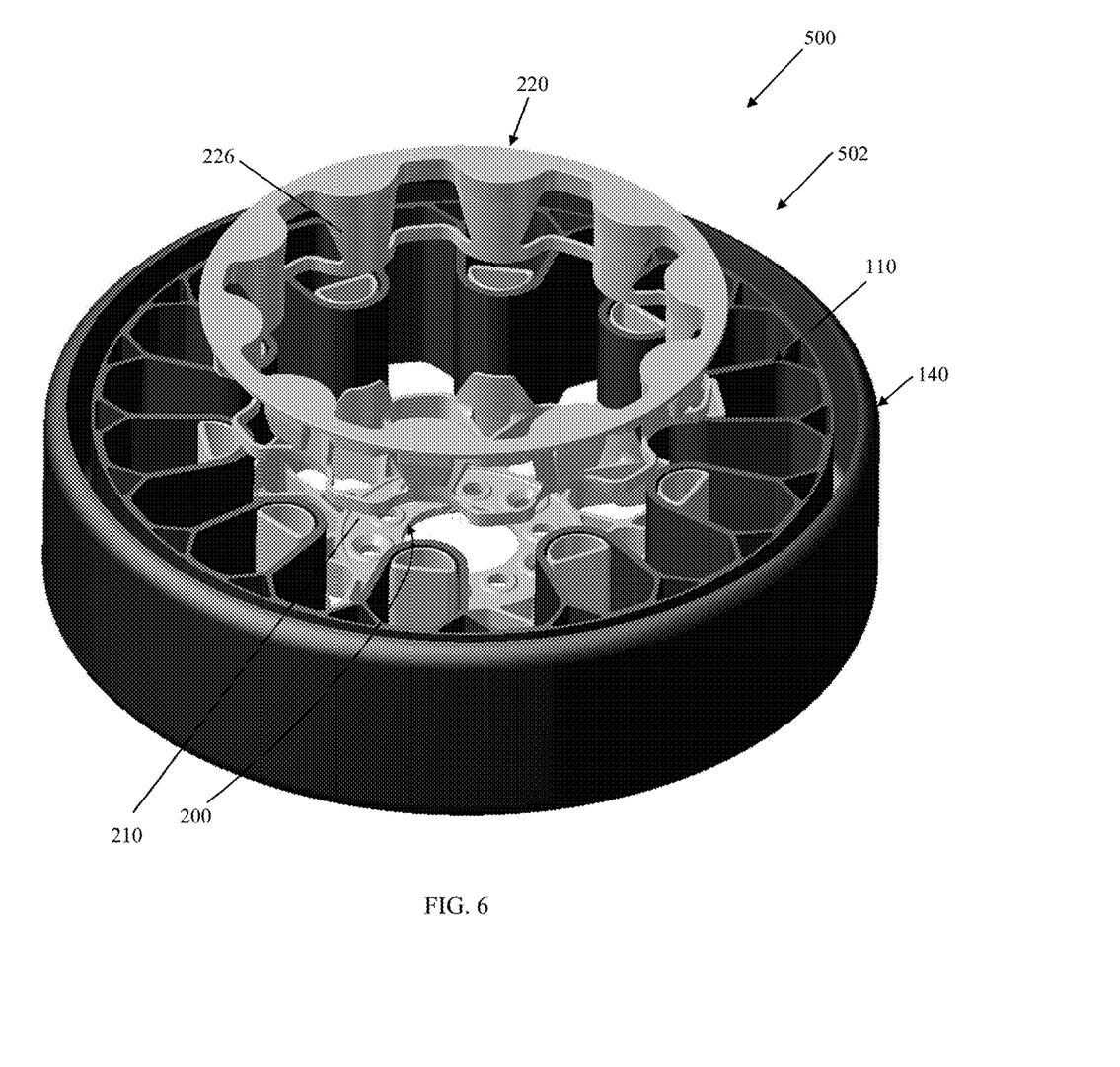
FIG. 6 is a schematic perspective view of the first and second parts of the wheel assembly in accordance with the present in invention and the example tire.

FIG. 6 shows a second step 502 of the example assembly method 500. The second rim piece 220 may be lowered on to the combined first rim piece 210 and tire assembly 140. As described above, the lugs 222 of the second rim piece 220 may be inserted into the corresponding semi-cylindrical cavities of the first rim piece 210 thereby securing the first and second rim pieces 210, 220 both circumferentially and radially to each other. Further, parts of the spoke structure 110 of the tire assembly may be sandwiched between the friction plate 212 of the first rim piece, the saddle plates 216 of the first rim piece, and the saddle plates 222 of the second rim piece 220.

Figure 7:
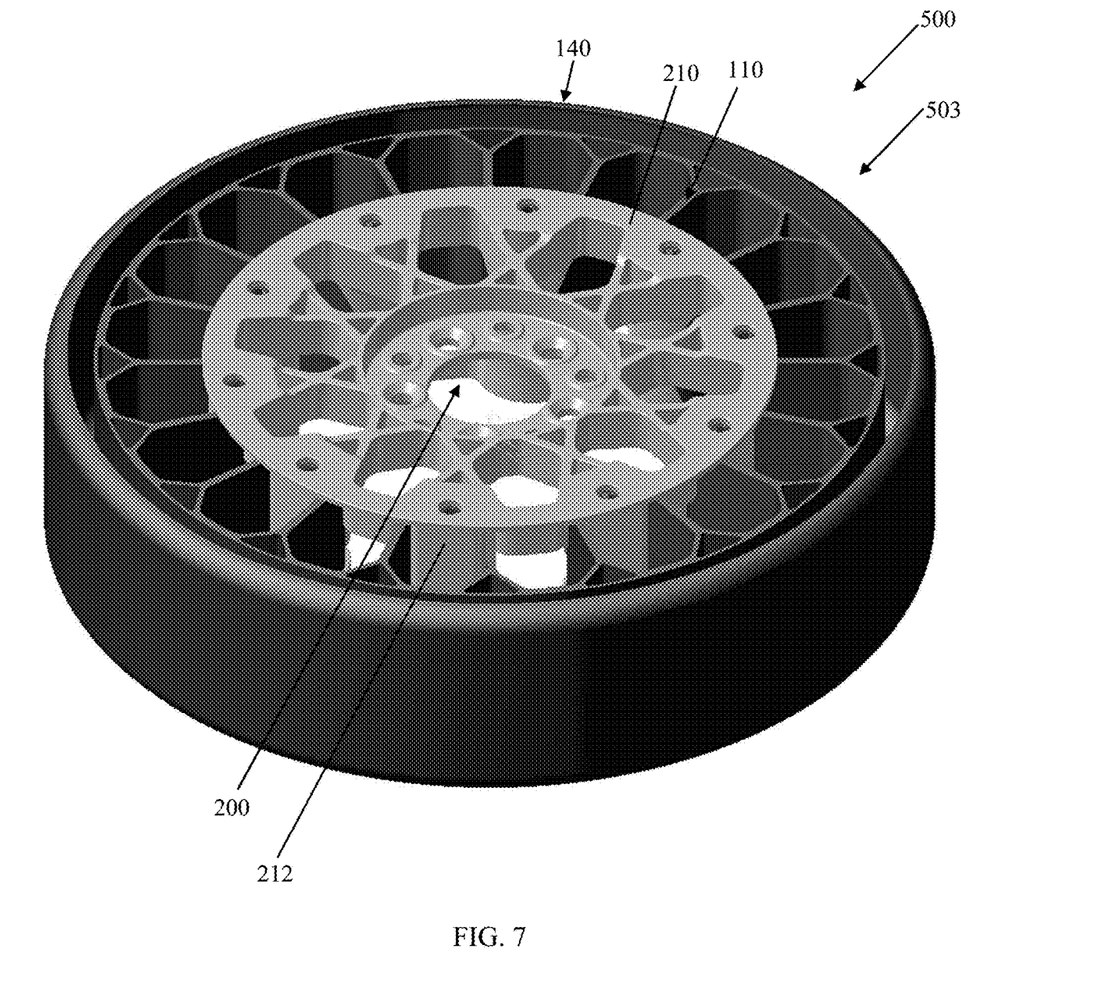
FIG. 7 is another schematic perspective view of the first and second parts of the wheel assembly in accordance with the present in invention and the example tire.

FIGS. 7-9 show a third step 503 of the example assembly method 500. The complete wheel assembly 200 and tire assembly 140 are combined for use except for the bolts 251.

FIGS. 10 shows a fourth step 504 of the example assembly method 500. The complete wheel assembly 200 and tire assembly 140 are interlocked and secured to each other by the bolts 251. The combined wheel assembly and tire assembly 140, 200 may then be installed on a vehicle. Each bolt 251 may thereby extend through an unthreaded or threaded bore circumferentially and radially aligned with the semi-cylindrical cavity of a corresponding friction plate 212 to a corresponding threaded bore 223.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A wheel assembly comprising:
   a first rim piece for engaging a rotatable axle; and
   a second rim piece for engaging the rotatable axle, the first rim piece having axially extending curved friction tubes for engaging a first side of a spoke structure of a tire, axially outer ends of the friction tubes engaging axially extending lugs of the second rim piece to form a single split wheel assembly,
   each lug of the second rim piece having an axial blind threaded bore for receiving a threaded bolt to secure the tire, the first rim piece, and the second rim piece together.

2. The wheel assembly as set forth in claim 1 wherein the friction tubes of the first rim piece have cylindrical convex surfaces corresponding to a shape of the spoke structure of the tire to be engaged by the friction tubes.

3. The wheel assembly as set forth in claim 1 wherein the friction tubes of the first rim piece define a semi-cylindrical hollow cavity for receiving the lugs of the second rim piece and bolts.

4. The wheel assembly as set forth in claim 1 wherein the first rim piece includes axially extending curved saddle plates for engaging a second side of the spoke structure of the tire assembly, the second side of the spoke structure being axially opposite the first side of the spoke structure of the tire.

5. The wheel assembly as set forth in claim 1 wherein the second rim piece includes axially extending curved saddle plates for engaging a second side of the spoke structure of the tire.

6. The wheel assembly as set forth in claim 1 wherein parts of the spoke structure are secured in a sandwich configuration with parts of the spoke structure being disposed between the friction tubes and part of the second rim piece.

7. The wheel assembly as set forth in claim 1 wherein axially outer ends of saddle plates of both the first rim piece and the second rim piece axially abut each other when the wheel assembly and tire are secured by bolts.

8. The wheel assembly as set forth in claim 1 wherein the first rim piece is constructed as a single integral component.

9. The wheel assembly as set forth in claim 1 wherein the second rim piece is constructed as a single integral component.

10. A method for securing a wheel assembly and a tire together, the method comprising the steps of:
    laying a first rim piece on a horizontal surface;
    lowering the tire on to the first rim piece with friction tubes corresponding to openings in a spoke structure of the tire;
    lowering a second rim piece on to the combined first rim piece and tire;

inserting radially extending lugs of the second rim piece into corresponding semi-cylindrical cavities of the first rim piece; and securing the first and second rim pieces both circumferentially and radially to each other while simultaneously securing the tire to the first and second rim pieces.

11. The method as set forth in claim 10 further including the step of sandwiching parts of the tire between friction tubes of the first rim piece and saddle plates of the second rim piece.

12. The method as set forth in claim 10 further including the step of approximating curvatures of surfaces of the friction tubes of the first rim piece with curvatures of parts of the tire.

13. The method as set forth in claim 10 further including the step of interlocking the tire with the first rim piece and the second rim piece.

14. The method as set forth in claim 10 further including the step of securing the first rim piece, the second rim piece, and the tire together for installation on an axle of a vehicle.

15. The method as set forth in claim 10 further including the step of constructing the first rim piece and the second rim piece of metal.

16. The method as set forth in claim 10 further including the step of sandwiching curved parts of the tire between convex friction tubes of the first rim piece and concave saddle plates of the second rim piece.

17. The method as set forth in claim 10 further including the step of sandwiching curved parts of the tire between convex friction tubes of the first rim piece and concave saddle plates of the first rim piece.

18. The method as set forth in claim 10 further including the step of sandwiching curved parts of the tire between convex friction tubes of the first rim piece and concave saddle plates of both the first rim piece and the second rim piece.

19. The method as set forth in claim 10 further including the step of inserting threaded bolts within semi-cylindrical cavities of the first rim piece.

* * * * *